US012456477B2

(12) United States Patent
Mosayyebpour Kaskari

(10) Patent No.: US 12,456,477 B2
(45) Date of Patent: Oct. 28, 2025

(54) AUDIO SOURCE SEPARATION FOR MULTI-CHANNEL BEAMFORMING BASED ON FACE DETECTION

(71) Applicant: Synaptics Incorporated, San Jose, CA (US)

(72) Inventor: Saeed Mosayyebpour Kaskari, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 294 days.

(21) Appl. No.: 18/303,432

(22) Filed: Apr. 19, 2023

(65) Prior Publication Data
US 2024/0355349 A1    Oct. 24, 2024

(51) Int. Cl.
*G10L 21/0272* (2013.01)
*G06V 40/16* (2022.01)
(Continued)

(52) U.S. Cl.
CPC ........ *G10L 21/0272* (2013.01); *G06V 40/161* (2022.01); *G10L 21/0216* (2013.01);
(Continued)

(58) Field of Classification Search
CPC ............. G10L 21/0272; G10L 21/0216; G10L 21/0208; G10L 21/0308; G10L 25/30; G10L 25/84; G10L 25/78; G10L 2021/02166; G10L 2021/02165; G06V 40/161; G06V 40/172; G06V 40/171; G06V 40/176; G06V 10/764; G06V 10/82;
(Continued)

(56) References Cited

U.S. PATENT DOCUMENTS 10,206,036 B1 *    2/2019    Feng ................... G06V 40/161
11,218,802 B1 *    1/2022    Kandadai ............... G06F 3/165
(Continued)

OTHER PUBLICATIONS

Knapp et al., "The Generalized Correlation Method for Estimation of Time Delay," IEEE Trans. Signal Process., vol. 24, No. 4, pp. 320-327, 1976.
(Continued)

*Primary Examiner* — Yogeshkumar Patel
(74) *Attorney, Agent, or Firm* — Paradice & Li LLP

(57) ABSTRACT

This disclosure provides methods, devices, and systems for speech enhancement. The present implementations more specifically relate to utilizing multiple modalities to suppress audio originating from a distractor audio source without distorting audio originating from a target audio source. In some aspects, a speech enhancement system may receive a multi-channel audio signal via a microphone array and may further receive an image associated with a respective frame of the audio signal. The speech enhancement system detects one or more target faces in the image and determines whether the audio frame originates from a target audio source. For example, the speech enhancement system may compare a respective direction of each target face with a direction-of-arrival (DOA) of the audio frame. The speech enhancement system may selectively steer a beam associated with a multi-channel beamformer toward the DOA of the audio frame based on whether the audio frame originates from a target face.

20 Claims, 8 Drawing Sheets

(51) Int. Cl.
*G10L 21/0216* (2013.01)
*H04R 3/00* (2006.01)
*H04R 5/027* (2006.01)
*H04S 3/00* (2006.01)

(52) U.S. Cl.
CPC ............. *H04R 3/005* (2013.01); *H04R 5/027* (2013.01); *H04S 3/008* (2013.01); *G10L 2021/02166* (2013.01); *H04S 2400/01* (2013.01); *H04S 2400/15* (2013.01)

(58) Field of Classification Search
CPC ........ G06V 20/35; H04R 3/005; H04R 5/027; H04R 29/005; H04R 1/406; H04R 2430/23; H04R 2430/25; H04R 2201/401; H04S 3/008; H04S 7/303; H04S 2400/01; H04S 2400/15; G06T 2207/10024
See application file for complete search history.

(56) References Cited

U.S. PATENT DOCUMENTS

| | | | |
|---|---|---|---|
| 2014/0112487 A1* | 4/2014 | Laska | H04M 9/082 381/92 |
| 2016/0071526 A1* | 3/2016 | Wingate | G01S 3/807 704/233 |
| 2016/0192068 A1* | 6/2016 | Ng | H04R 1/406 381/92 |
| 2017/0178662 A1* | 6/2017 | Ayrapetian | G10L 21/0208 |
| 2017/0265012 A1* | 9/2017 | Tico | H04S 7/303 |
| 2017/0325020 A1* | 11/2017 | Wolff | G10L 21/0216 |
| 2019/0172450 A1* | 6/2019 | Mustiere | G10L 21/0232 |
| 2019/0355373 A1* | 11/2019 | Nesta | G10L 21/028 |

OTHER PUBLICATIONS

Redmon et al., "You Only Look Once: Unified, Real-Time Object Detection" arXiv:1506.02640v5 [cs.CV], pp. 1-10, May 9, 2016.

* cited by examiner

AUDIO SOURCE SEPARATION FOR MULTI-CHANNEL BEAMFORMING BASED ON FACE DETECTION

TECHNICAL FIELD

The present implementations relate generally to signal processing, and specifically to audio source separation for multi-channel beamforming based on face detection.

BACKGROUND OF RELATED ART

Beamforming is a signal processing technique that can focus the energy of signals transmitted or received in a spatial direction. For example, a beamformer can improve the quality of speech detected by a microphone array through signal combining at the microphone outputs. More specifically, the beamformer may apply a respective weight to the audio signal output by each microphone of the microphone array so that the signal strength is enhanced in the direction of the speech (or suppressed in the direction of noise) when the audio signals are combined. Adaptive beamformers are capable of dynamically adjusting the weights of the microphone outputs to optimize the quality, or the signal-to-noise ratio (SNR), of the combined audio signal. As such, an adaptive beamformer can adapt to changes in the environment. Example adaptive beamforming techniques include minimum mean square error (MMSE) beamforming, minimum variance distortionless response (MVDR) beamforming and generalized eigenvalue (GEV) beamforming, among other examples.

In far-field applications, adaptive beamformers may be unable to distinguish between speech originating from a target audio source (such as a user of the microphone array) and speech originating from a distractor audio source (such as a person speaking in the background). As a result, when the target audio source and the distractor audio source speak at the same time, an adaptive beamformer may fail to suppress the distractor speech as background noise. Thus, there is a need to improve the separation of target speech and distractor speech by adaptive beamformers in far-field applications.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of processing audio signals. The method includes receiving an audio signal via a plurality of microphones; receiving an image associated with a frame of the audio signal; detecting one or more faces in the received image; selecting a number (N) of target faces among the one or more faces detected in the received image; determining a respective direction of each of the N target faces relative to the plurality of microphones; and selectively steering a beam associated with a multi-channel beamformer toward a direction-of-arrival (DOA) of the audio signal based at least in part on the directions of the N target faces.

Another innovative aspect of the subject matter of this disclosure can be implemented in a speech enhancement system, including a processing system and a memory. The memory stores instructions that, when executed by the processing system, cause the speech enhancement system to receive an audio signal via a plurality of microphones; receive an image associated with a frame of the audio signal; detect one or more faces in the received image; select a number (N) of target faces among the one or more faces detected in the received image; determine a respective direction of each of the N target faces relative to the plurality of microphones; and selectively steer a beam associated with a multi-channel beamformer toward a DOA of the audio signal based at least in part on the directions of the N target faces.

BRIEF DESCRIPTION OF THE DRAWINGS

The present implementations are illustrated by way of example and are not intended to be limited by the figures of the accompanying drawings.

DETAILED DESCRIPTION

Figure 1:
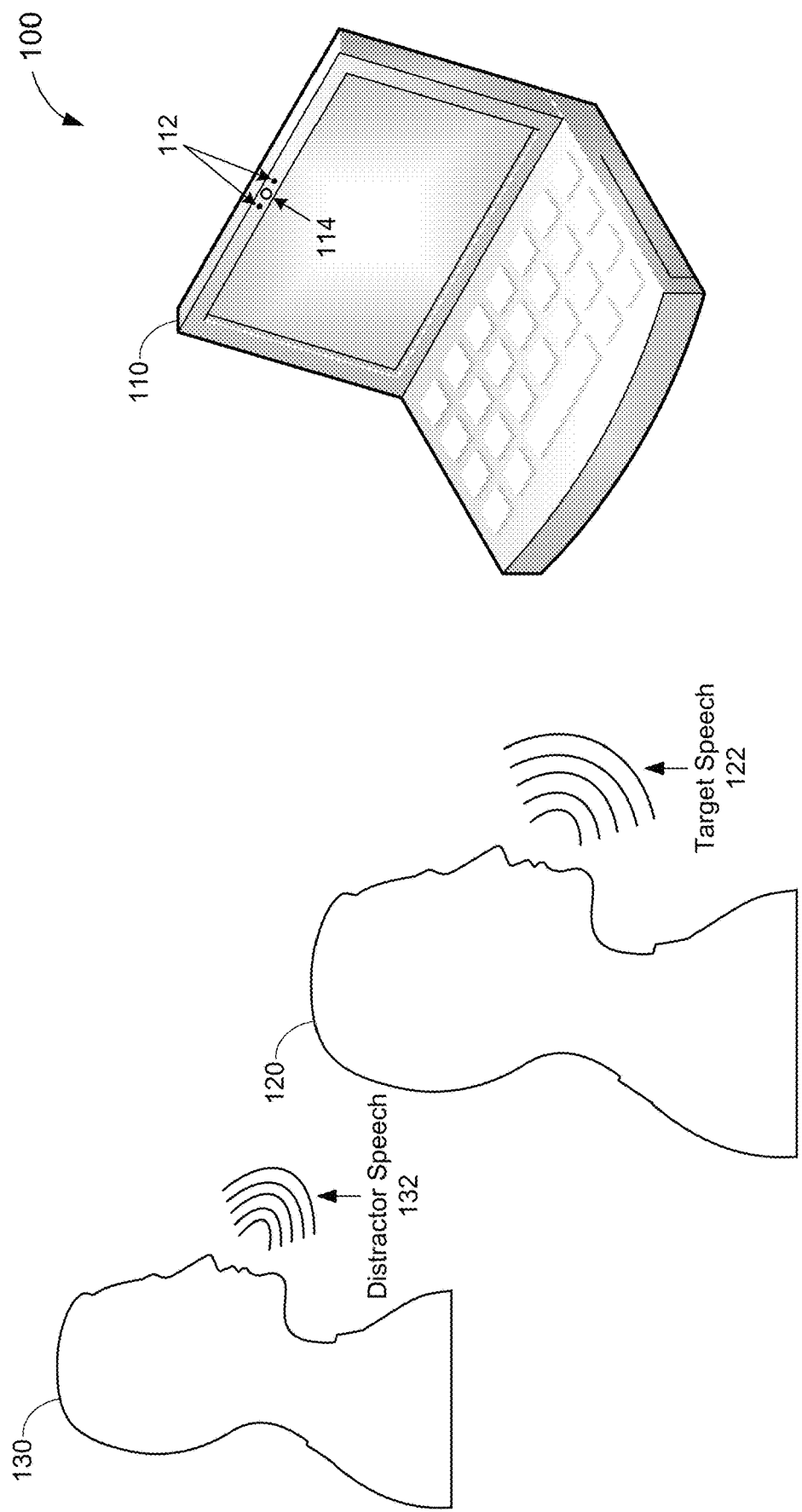
FIG. 1 shows an example environment for which speech enhancement may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result.

The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, a beamformer can improve the quality of speech detected by a microphone array through signal combining at the microphone outputs. For example, the beamformer may apply a respective weight to the audio signal output by each microphone of the microphone array so that the signal strength is enhanced in the direction of the speech (or suppressed in the direction of noise) when the audio signals are combined. Adaptive beamformers are capable of dynamically adjusting the weights of the microphone outputs to optimize the quality, or the signal-to-noise ratio (SNR), of the combined audio signal. Example adaptive beamforming techniques include minimum mean square error (MMSE) beamforming, minimum variance distortionless response (MVDR) beamforming, and generalized eigenvalue (GEV) beamforming, among other examples.

In far-field applications, adaptive beamformers may be unable to distinguish between speech originating from a target audio source (such as a user of the microphone array) and speech originating from a distractor audio source (such as a person speaking in the background). As a result, when the target audio source and the distractor audio source speak at the same time, an adaptive beamformer may fail to suppress the distractor speech as background noise. Many communication devices include additional sensors that can be used to determine the spatial positioning of audio sources in an environment. For example, in videoconferencing applications, a camera captures images (or video) of an environment while a microphone array concurrently captures audio from the environment. Aspects of the present disclosure recognize that the images can provide an additional modality for discriminating between target and distractor audio sources in the environment.

Various aspects relate generally to speech enhancement, and more particularly, to utilizing multiple modalities to suppress audio originating from a distractor audio source without distorting audio originating from a target audio source. In some aspects, a speech enhancement system may receive a multi-channel audio signal via a microphone array and may further receive an image associated with a respective frame of the audio signal. For example, the image may be captured at substantially the same time as the respective audio frame. The speech enhancement system detects one or more target faces (representing target audio sources) in the image and determines whether the audio frame originates from a target audio source. For example, the speech enhancement system may compare a respective direction of each target face with a direction-of-arrival (DOA) of the audio frame (relative to the microphone array). In some implementations, the speech enhancement system may selectively steer a beam associated with a multi-channel beamformer toward the DOA of the audio frame based on whether the audio frame is determined to originate from a target face.

Particular implementations of the subject matter described in this disclosure can be implemented to realize one or more of the following potential advantages. By utilizing multiple modalities to determine whether each frame of an audio signal originates from a target face, aspects of the present disclosure may enhance the quality of speech detected from far-field audio sources. More specifically, the speech enhancement system of the present implementations may utilize images of an environment to verify or validate the beam direction adopted by an adaptive beamformer. As a result, the speech enhancement system may steer the beam associated with the multi-channel beamformer in the adopted beam direction when the adopted beam direction is aligned with one of the target faces, and refrain from steering the beam in the adopted beam direction when the adopted beam direction is not aligned with any of the target faces. Unlike existing speech enhancement techniques that rely solely on adaptive beamforming, aspects of the present disclosure can separate target audio from distractor audio even in far-field applications.

FIG. 1 shows an example environment 100 for which speech enhancement may be implemented. The example environment 100 includes a communication device 110, a user 120 of the communication device 110 (also referred to as a "target audio source" or "target source"), and a speaker 130 in the background (also referred to as a "distractor audio source" or "distractor source"). In some aspects, the communication device 110 may include multiple microphones 112 (also referred to as a "microphone array") and a camera 114. In the example of FIG. 1, the communication device 110 is shown to include two microphones 112. However, in actual implementations, the communication device 110 may include additional microphones (not shown for simplicity).

The microphones 112 are positioned or otherwise configured to detect acoustic waves, including target speech 122 and distractor speech 132, propagating through the environment 100. For example, the target speech 122 may include any sounds produced by the user 120. By contrast, the distractor speech 132 may include any sounds produced by the background speaker 130 as well as any other sources of background noise (not shown for simplicity). The microphones 112 may convert the detected acoustic waves to an electrical signal (also referred to as an "audio signal") representative of the acoustic waveform. Accordingly, each audio signal may include a speech component (representing the target speech 122) and a noise component (representing the distractor speech 132). Due to differences in spatial positioning, sounds detected by one of the microphones 112 may be delayed relative to the sounds detected by the other microphone. In other words, the microphones 112 may produce audio signals with varying phase offsets.

In some aspects, the communication device 110 may include a multi-channel beamformer that weights and combines the audio signals produced by each of the microphones 112 to enhance the speech component or suppress the noise component. More specifically, the weights applied to the audio signals may improve the signal strength or SNR in a direction of the target speech 122. Such signal processing techniques are generally referred to as "beamforming." In some implementations, an adaptive beamformer may estimate (or predict) a set of weights to be applied to the audio signals (also referred to as a "beamforming filter") that steers the beam in the direction of the target speech 122. The quality of speech in the resulting signal depends on the accuracy of the beamforming filter. For example, the speech component may be enhanced if the beam direction is aligned with a direction of the user 120. On the other hand, the speech component may be distorted or suppressed if the beam direction is aligned with a direction of the background speaker 130 (or any direction away from the user 120).

In near-field applications (such as where the user 120 is very close to the microphones 122 while the background speaker 130 is significantly farther from the microphones 122), the SNR of the target speech 122 may be substantially higher than the SNR of the distractor speech 132. As such, a voice activity detector (VAD) can be used to distinguish between speech originating from a target audio source and speech originating from a distractor audio source. In far-field applications (such as where the user 120 and the background speaker 130 are relatively far from the microphones 122), the SNR of the target speech 122 may be similar to the SNR of the distractor speech 132. As such, existing VADs may be unable to distinguish between speech originating from a target audio source and speech originating from a distractor audio source. In other words, an adaptive beamformer may be unable to discern whether the user 120 or the background speaker 130 is the target audio source. As a result, the adaptive beamformer may adopt beam directions that enhance target speech and distractor speech.

Aspects of the present disclosure recognize that the camera 114 can be further used to determine the spatial positioning of the user 120 and the background speaker 130 relative to the microphones 112. For example, in videoconferencing applications, the camera 114 may capture images (or video) of the environment 100 while the microphones 112 concurrently capture audio from the environment 100. In some aspects, the communication device 110 may utilize the images captured by the camera 114 as an additional modality for discriminating between a target audio source and a distractor audio source. For example, the communication device 110 may determine respective directions of the user 120 and the background speaker 130 relative to the microphones 112 based on the captured images. In some implementations, the communication device 110 may further determine whether the beamforming direction of an adaptive beamformer is aligned with the direction of the user 120 (or other target audio source) based on a direction-of-arrival (DOA) of the audio signals received via the microphones 112. In other words, the communication device 110 may utilize the images captured by the camera 114 to verify or validate the beam direction adopted by the adaptive beamformer.

Figure 2:
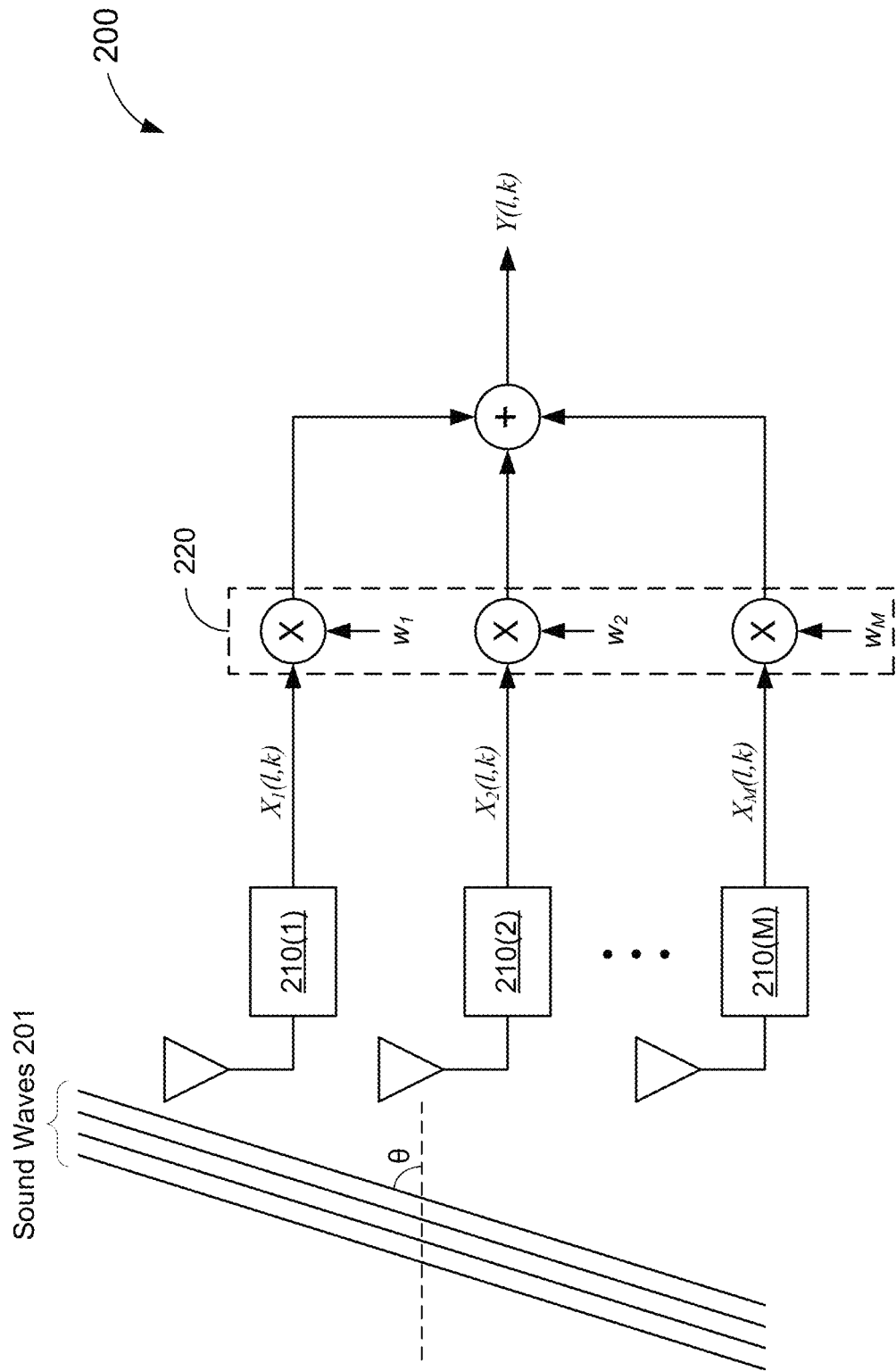
FIG. 2 shows an example audio receiver that supports multi-channel beamforming.

FIG. 2 shows an example audio receiver 200 that supports multi-channel beamforming. The audio receiver 200 includes a number (M) of microphones 210(1)-210(M), arranged in a microphone array, and a beamforming filter 220. In some implementations, the audio receiver 200 may be one example of the communication device 110 of FIG. 1. With reference for example to FIG. 1, each of the microphones 210(1)-210(M) may be one example of any of the microphones 112.

The microphones 210(1)-210(M) are configured to convert a series of sound waves 201 (also referred to as "acoustic waves") into audio signals $X_1(l,k)$-$X_M(l,k)$, respectively, where l is a frame index and k is a frequency index associated with a time-frequency domain. As shown in FIG. 2, the sound waves 201 are incident upon the microphones 210(1)-210(M) at an angle ($\theta$). The angle $\theta$ also may be referred to as the "direction-of-arrival" (DOA) of the audio signals $X_1(l,k)$-$X_M(l,k)$. In some implementations, the sound waves 201 may include target speech (such as the target speech 122 of FIG. 1) mixed with distractor speech (such as the distractor speech 132 of FIG. 1). The target speech and distractor speech represent a speech component ($S(l,k)$) and a noise component ($N(l,k)$), respectively, in each of the audio signals $X_1(l,k)$-$X_M(l,k)$.

Due to the spatial positioning of the microphones 210(1)-210(M), each of the audio signals $X_1(l,k)$-$X_M(l,k)$ may represent a delayed version of the same audio signal. For example, using the first audio signal $X_1(l,k)$ as a reference audio signal, each of the remaining audio signals $X_2(l,k)$-

$X_M(l,k)$ can be described as a phase-delayed version of the first audio signal $X_1(l,k)$. Accordingly, the audio signals $X_1(l,k)$-$X_M(l,k)$ can be modeled as a vector $(X(l,k))$:

$$X(l, k) = a(\theta, k)S(l, k) + N(l, k) \quad (1)$$

where $X(l,k)=[X_1(l,k), \ldots, X_M(l,k)]^T$ is a multi-channel audio signal and $a(\theta,k)$ is a steering vector which represents the set of phase-delays for a sound wave 201 incident upon the microphones 210(1)-210(M).

The beamforming filter 220 applies a vector of weights $w(l,k)=[w_1(l,k), \ldots, w_M(l,k)]^T$ (where $w_1$-$w_M$ are referred to as filter coefficients) to the audio signal $X(l,k)$ to produce an enhanced audio signal $(Y(l,k))$:

$$Y(l, k) = w^H(l, k)X(l, k) = w^H(l, k)a(\theta, k)S(l, k) + w^H(l, k)N(l, k) \quad (2)$$

The vector of weights $w(l,k)$ determines the direction of a "beam" associated with the beamforming filter 220. Thus, the filter coefficients $w_1$-$w_M$ can be adjusted to "steer" the beam in various directions.

In some aspects, an adaptive beamformer (not shown for simplicity) may determine a vector of weights $w(l,k)$ that optimizes the enhanced audio signal $Y(l,k)$ with respect to one or more conditions. For example, an MVDR beamformer is configured to determine a vector of weights $w(l,k)$ that reduces or minimizes the variance of the noise component of the enhanced audio signal $Y(l,k)$ without distorting the speech component of the enhanced audio signal $Y(l,k)$. In other words, the vector of weights $w(l,k)$ may satisfy the following condition:

$$\arg\min_w w^H(l, k)\Phi_{NN}(l, k)w(l, k) \text{ s.t. } w^H(l, k)a(\theta, k) = 1$$

where $\Phi_{NN}(l,k)$ is the covariance of the noise component $N(l,k)$ of the received audio signal $X(l,k)$. The resulting vector of weights $w$ is an MVDR beamforming filter $(w_{MVDR}(k))$, which can be expressed as:

$$w_{MVDR}(l, k) = \frac{\Phi_{NN}^{-1}(l, k)a(\theta, k)}{a^H(\theta, k)\Phi_{NN}^{-1}(l, k)a(\theta, k)} \quad (3)$$

As shown in Equation 3, some MVDR beamformers may rely on geometry (such as the steering vector $a(\theta,k)$) to determine the vector of weights $w(l,k)$. As such, the accuracy of the MVDR beamforming filter $w_{MVDR}(l,k)$ depends on the accuracy of the steering vector $a(\theta,k)$ estimation, which may be difficult to adapt to different users. Aspects of the present disclosure recognize that the MVDR beamforming filter $W_{MVDR}(l,k)$ also can be expressed as a function of the covariance $((\Phi_{SS}(l,k))$ of the speech component $S(l,k)$:

$$w_{MVDR}(l, k) = \frac{W(l, k)}{W_{norm}(l, k)}u(l, k) \quad (4)$$

$$W(l, k) = \Phi_{NN}^{-1}(l, k)\Phi_{SS}(l, k) \quad (5)$$

where $u(l,k)$ is the one-hot vector representing a reference microphone channel and $W_{norm}(l,k)$ is a normalization factor associated with $W(l,k)$. Example suitable normalization factors include, among other examples, $W_{norm}(l,k)=\max(|W(l, k)|)$ and $W_{norm}(l,k)=\text{trace}(W(l,k))$.

In some aspects, the noise covariance $\Phi_{NN}(l,k)$ and the speech covariance $(\Phi_{SS}(l,k)$ may be estimated or updated over time through supervised learning. For example, the speech covariance $\Phi_{SS}(l,k)$ can be estimated when speech is present in the received audio signal $X(l,k)$ and the noise covariance $\Phi_{NN}(l,k)$ can be estimated when speech is absent from the received audio signal $X(l,k)$. In some implementations, a deep neural network (DNN) may be used to determine whether speech is present or absent in the audio signal $X(l,k)$. For example, the DNN may be trained to infer a likelihood or probability of speech in each frame of the audio signal $X(l,k)$. As described with reference to FIG. 1, existing VADs may be unable to separate target speech from distractor speech in far-field applications. Thus, in some implementations, the adaptive beamformer may rely on additional modalities (such as images of the audio sources) to determine the covariances $\Phi_{SS}(l,k)$ and $\Phi_{NN}(l,k)$.

Figure 3:
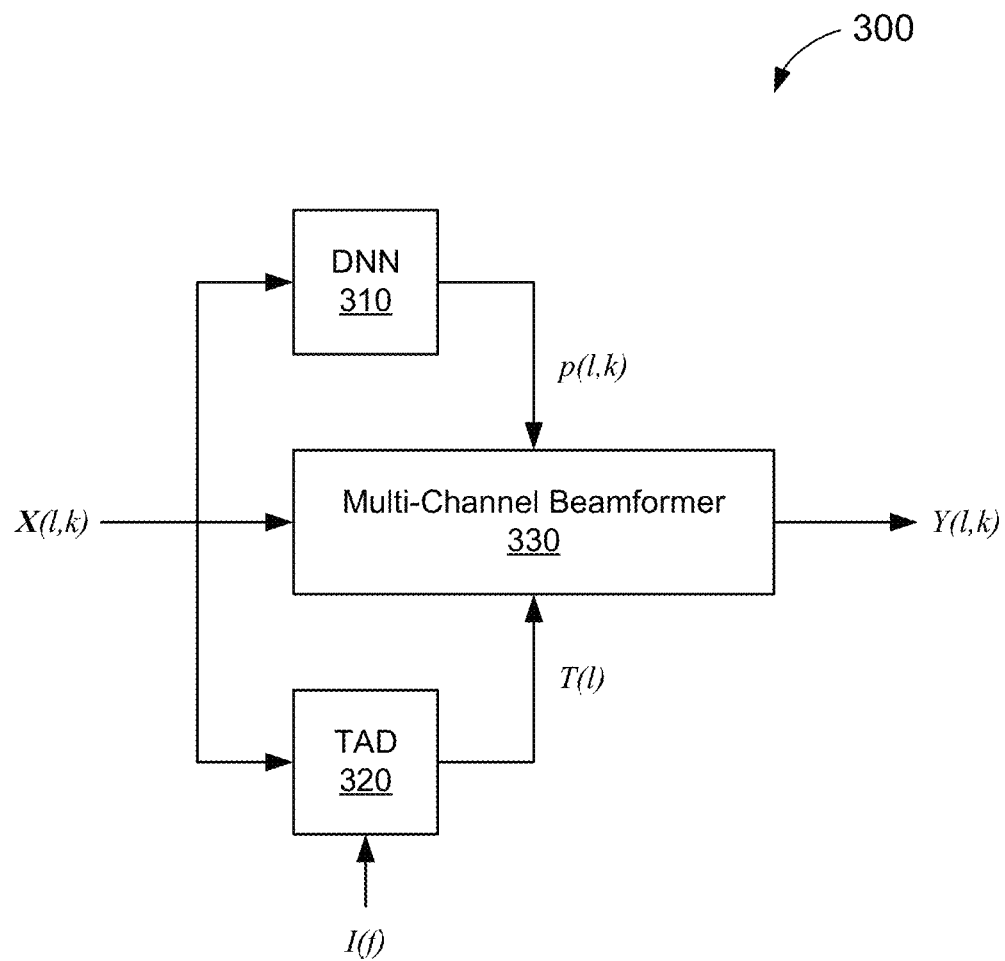
FIG. 3 shows a block diagram of an example speech enhancement system, according to some implementations.

FIG. 3 shows a block diagram of an example speech enhancement system 300, according to some implementations. The speech enhancement system 300 is configured to produce an enhanced audio signal $Y(l,k)$ based on a multi-channel audio signal $X(l,k)$ received via a microphone array. With reference for example to FIG. 2, the multi-channel audio signal $X(l,k)$ may be one example of the audio signals $X_1(l,k)$-$X_M(l,k)$ received via the microphones 210(1)-210(M).

The speech enhancement system 300 includes a DNN 310, a target activity detector (TAD) 320, and a multi-channel beamformer 330. The DNN 310 is configured to infer a probability of speech $p(l,k)$ in each frame l of the audio signal $X(l,k)$ based on a neural network model, where $0 \le p(l,k) \le 1$. For example, during a training phase, the DNN 310 may be provided with a large volume of audio signals containing speech mixed with background noise. The DNN 310 also may be provided with clean speech signals representing only the speech component of the audio signal (without background noise). The DNN 310 compares the audio signals with the clean speech signals to determine a set of features that can be used to classify speech. During an inferencing phase, the DNN 310 infers a probability of speech in each frame l of the audio signal $X(l,k)$, at each frequency index k, based on the classification results. Examples suitable DNNs include convolutional neural networks (CNNs) and recurrent neural networks (RNNs), among other examples.

The TAD 320 is configured to determine or predict whether each frame l of the audio signal $X(l,k)$ originates from a target audio source based, at least in part, on a respective image $I(f)$ associated with the audio frame, where f is a frame index associated with a framerate at which images are acquired (which may be different than a framerate at which audio frames are acquired). For example, the image $I(f)$ may be captured by a camera located in the same environment as the microphone array. In some implementations, the TAD 320 may detect one or more faces (of speakers) in the image $I(f)$ and estimate a direction of each face relative to the microphone array. The TAD 320 may further compare the estimated directions of the detected faces to a DOA of the audio signal $X(l,k)$ to determine whether the current frame of the audio signal $X(l,k)$ originates from a target audio source (such as a face of a target speaker or user). In some implementations, the TAD 320 may output a target activity value (T(l)) indicating whether the audio signal X(l,k) originates from a target audio source.

The multi-channel beamformer 330 is configured to apply a vector of weights w(l,k) to the audio signal X(l,k) to produce the enhanced audio signal Y(l,k) (such as according to Equation 2). In some implementations, the multi-channel beamformer 330 may be an adaptive beamformer that determines the vector of weights w(l,k) to apply to each frame l of the audio signal X(l,k) based, at least in part, on the probability of speech p(l,k) and the target activity value T(l) associated with the respective audio frame. As shown in Equations 4 and 5, an MVDR beamforming filter $w_{MVDR}(l, k)$ can be determined based on the covariance of noise $\Phi_{NN}(l,k)$ and the covariance of speech $\Phi_{SS}(l,k)$ in the audio signal X(l,k). In some aspects, the multi-channel beamformer 330 may dynamically update the speech covariance ($\Phi_{SS}(l,k)$) and the noise covariance $\Phi_{NN}(l,k)$ based on the probability of speech p(l,k) and the target activity value T(l) associated with the respective audio frame.

In some implementations, the multi-channel beamformer 330 may update the speech covariance $\Phi_{SS}(l,k)$, based on the probability of speech p(l,k), when the target activity value T(l) indicates that the current audio frame originates from a target audio source (such as T(l)=1):

$$\Phi_{SS}(l, k) = (1 - p(l, k))\Phi_{SS}(l - 1, k) + p(l, k)(X(l, k)X^H(l, k)) \text{ if } T(l) = 1$$

In some other implementations, the multi-channel beamformer 330 may update the noise covariance $\Phi_{NN}(l,k)$, based on the probability of speech p(l,k), when the target activity value T(l) indicates that the current audio frame does not originate from a target audio source (such as T(l)=0):

$$\Phi_{NN}(l, k) = p(l, k)\Phi_{NN}(l - 1, k) + (1 - p(l, k))(X(l, k)X^H(l, k)) \text{ if } T(l) = 0$$

Aspects of the present disclosure recognize that an adaptive beamformer may sometimes adopt a beam direction that is aligned with a distractor audio source. In some aspects, the multi-channel beamformer may use the target activity value T(l) to determine or verify whether the adopted beam direction is aligned with a target audio source. In other words, the multi-channel beamformer 330 may selectively steer its beam in the adopted beam direction based on the target activity value T(l). In some implementations, the multi-channel beamformer 330 may steer its beam in the adopted beam direction when the target activity value T(l) indicates that the current frame of the audio signal X(l,k) originates from a target audio source.

In some other implementations, the multi-channel beamformer 330 may refrain from steering its beam in the adopted beam direction when the target activity value T(l) indicates that the current frame of the audio signal X(l,k) does not originate from a target audio source. In such implementations, the multi-channel beamformer 330 may implement a beamforming filter w(l,k) known to be aligned with a target audio source (to suppress distractor speech in the current audio frame). For example, the multi-channel beamformer 330 may store the beam directions associated with known target audio sources to support faster beam adaptation. Alternatively, the multi-channel beamformer 330 may be bypassed (so that beamforming is not performed on the current audio frame) when the target activity value T(l) indicates that the current frame of the audio signal X(l,k) does not originate from a target audio source.

Figure 4:
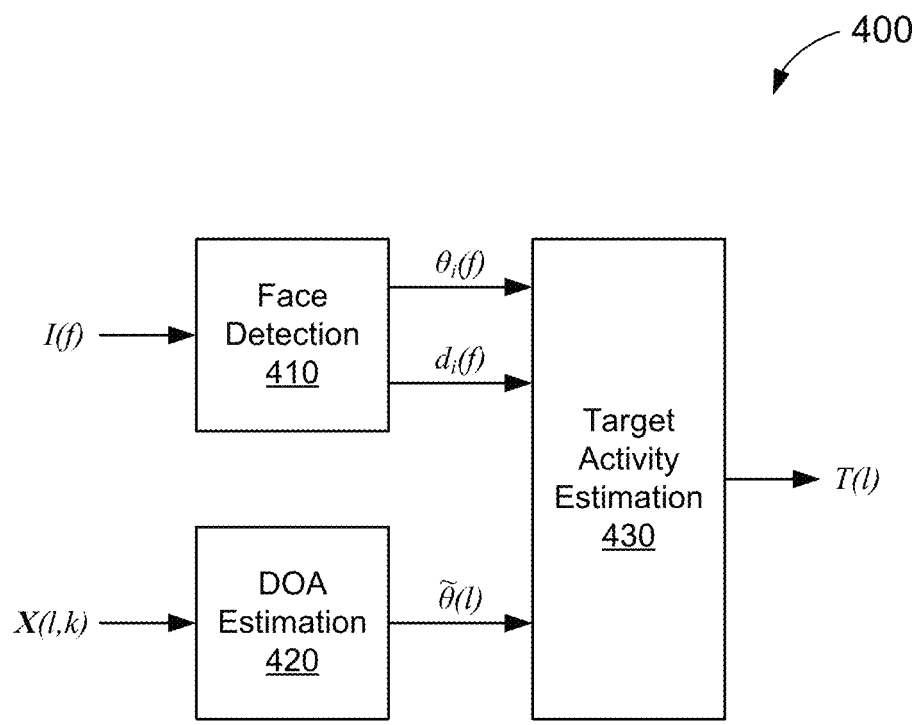
FIG. 4 shows a block diagram of an example target activity detector (TAD), according to some implementations.

FIG. 4 shows a block diagram of an example TAD 400, according to some implementations. In some implementations, the TAD 400 may be one example of the TAD 320 of FIG. 3. More specifically, the TAD 400 may be configured to determine or predict whether each frame l of a multi-channel audio signal X(l,k) originates from a target audio source based on a respective image I(f) associated with the audio frame. For example, the image I(f) may be captured by a camera located in the same environment as a microphone array used to capture the audio signal X(l,k). With reference for example to FIG. 1, the camera may be one example of the camera 114 and the microphone array may be one example of the microphone array 112.

The TAD 400 includes a face detection component 410, a DOA estimation component 420, and a target activity estimation component 430. The face detection component 410 is configured to detect faces in the received image I(f). In some implementations, the face detection component 410 may implement an object detection model that is trained or otherwise configured to detect faces in images or video. Example suitable object detection models include neural network models and statistical models, among other examples. The object detection model may apply one or more transformations to the pixels in the image I(f) to create one or more features that can be used for face detection. More specifically, the face detection component 410 may scan the image I(f) for sets of features (such as eyes, nose, and lips) that uniquely identify human faces. As a result, the face detection component 410 may detect any number (N) of faces in the received image I(f).

In some implementations, the face detection component 410 may determine a respective direction ($\theta_i(f)$) of each of the N faces, relative to the microphone array, based on the received image I(f), where i is an index associated with each of the N faces (i=[1, . . . , N]). For example, the face detection component 410 may draw a respective bounding box around each of the N faces. For each bounding box, the face detection component 410 may estimate the direction $\theta_i(f)$ of the respective face as the angle of deflection from the microphone array to the center of the bounding box.

In some other implementations, the face detection component 410 may determine a respective distance ($d_i(f)$) of each of the N faces, relative to the microphone array, based on the received image I(f). For example, the face detection component 410 may estimate the distance $d_i(f)$ of each face based on the size of the bounding box associated with the face (where larger bounding boxes are associated with faces closes to the microphone array and smaller bounding boxes are associated with faces farther away).

Still further, in some implementations, the face detection component 410 may determine additional characteristics or identifiers that can be used to discriminate between faces detected in the image I(f). Example suitable identifiers may include a name, user ID, or other information that can uniquely identify one or more faces in the image I(f). Aspects of the present disclosure recognize that additional facial analysis may consume significant power and processing resources. Thus, in some aspects, the face detection component 410 may selectively analyze the image I(f) for such additional identifiers based on various conditions of the speech enhancement system.

In some implementations, the face detection component 410 may analyze one or more faces in the image I(f) for additional characteristics or identifiers only if additional information is needed to determine whether a given face is a target audio source or a distractor audio source. In some other implementations, the face detection component 410 may analyze one or more faces in the image I(f) for additional characteristics or identifiers only if the amount of power available to the speech enhancement system exceeds a threshold power level.

The DOA estimation component 420 is configured to estimate the DOA ($\tilde{\theta}(l)$) of the received audio signal X(l,k). More specifically, the DOA estimation component 420 may estimate the beam direction adopted by an adaptive beamformer (such as the multi-channel beamformer 330 of FIG. 3) based on the received audio signal X(l,k). With reference for example to FIG. 2, the DOA $\tilde{\theta}(l)$ represents the angle ($\theta$) at which the sound waves 201 are incident upon the microphones 210(1)-210(M).

In some implementations, the DOA estimation component 420 may estimate the DOA $\tilde{\theta}(l)$ based on a delay between the audio signals $X_1(l,k)$-$X_M(l,k)$ received via respective microphones of the microphone array. With reference for example to FIG. 2, the audio signals $X_1(l,k)$ and $X_2(l,k)$ received via the microphones 210(1) and 210(2), respectively, can be expressed as time-domain signals $x_1(t)$ and $x_2(t)$:

$$x_1(t) = s(t) + n_1(t)$$
$$x_2(t) = \alpha s(t+D) + n_2(t)$$

where s(t) represents the speech component in each of the audio signals $x_1(t)$ and $x_2(t)$; $n_1(t)$ and $n_2(t)$ represent the noise components in the audio signals $x_1(t)$ and $x_2(t)$, respectively; $\alpha$ is an attenuation factor associated with the second audio signal $x_2(t)$; and D is a delay between the first audio signal $x_1(t)$ and the second audio signal $x_2(t)$.

Aspects of the present disclosure recognize that the delay D can be determined by computing the cross correlation ($R_{x_1 x_2}(\tau)$) of the audio signals $x_1(t)$ and $x_2(t)$:

$$R_{x_1 x_2}(\tau) = E[x_1(t)x_2(t-\tau)]$$

where E[•] is the expected value, and the value of $\tau$ that maximizes $R_{x_1 x_2}(\tau)$ provides an estimate of the delay D (and thus, the DOA $\tilde{\theta}(l)$).

The target activity estimation component 430 is configured to produce a respective target activity value T(l) for each frame l of the audio signal X(l,k) based, at least in part, on the DOA $\tilde{\theta}(l)$ of the audio frame and the distances $d_i(f)$ and directions $\theta_i(f)$ of each face i detected in the image I(f). More specifically, the target activity estimation component 430 may estimate whether the DOA $\tilde{\theta}(l)$ matches the direction of a target audio source. For example, one or more of the faces detected in the image I(f) may represent a target audio source.

In some implementations, the TAD 400 may be configured to operate in a single-user mode. In such implementations, the target activity estimation component 430 may select only one of the faces in the image I(f) as a target audio source (also referred to as a "target face"). In other words, the target activity estimation component 430 may produce a target activity estimation value T(l) indicating that the current frame of the audio signal X(l,k) originates from a target audio source only if the DOA $\tilde{\theta}(l)$ of the audio frame matches the direction of the target face.

In some other implementations, the TAD 400 may be configured to operate in a conference mode. In such implementations, the target activity estimation component 430 may select multiple faces in the image I(f) as target audio sources. In other words, the target activity estimation component 430 may produce a target activity estimation value T(l) indicating that the current frame of the audio signal X(l,k) originates from a target audio source if the DOA $\tilde{\theta}(l)$ of the audio frame matches a direction of any of the target faces.

Figure 5:
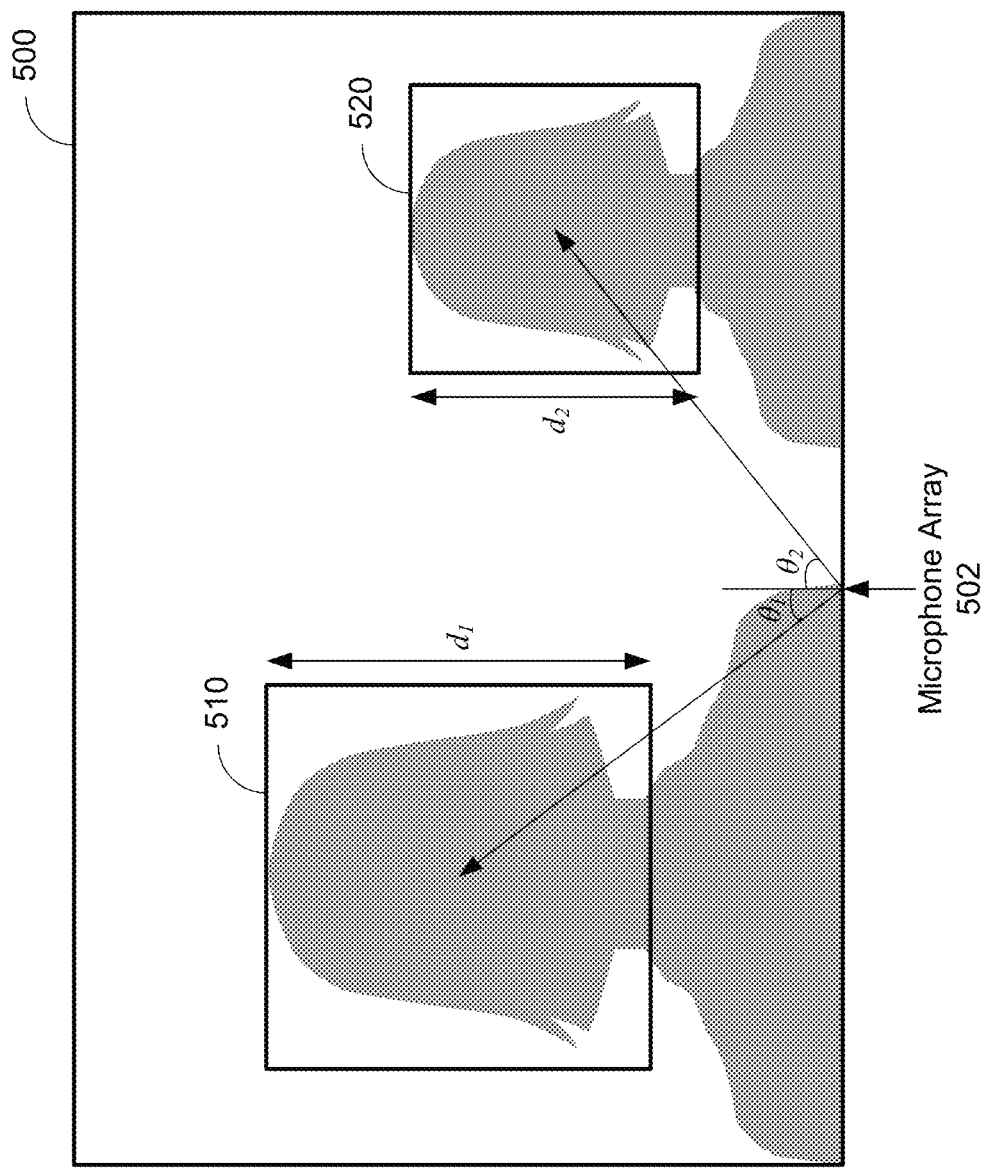
FIG. 5 shows an example image of an environment that includes multiple audio sources.

FIG. 5 shows an example image 500 of an environment that includes multiple audio sources 510 and 520. More specifically, the image 500 may be captured by a camera associated with a speech enhancement system (such as the speech enhancement system 300 of FIG. 3) or a TAD (such as the TAD 400 of FIG. 4). Thus, in some implementations, the image 500 may be one example of any of the images I(f) of FIG. 3 or 4.

In the example of FIG. 5, the audio sources 510 and 520 are depicted as bounding boxes around respective faces. In some aspects, the bounding boxes may be generated by an object detection model trained to detect human faces in images or video (such as the face detection component 410 of FIG. 4). With reference for example to FIG. 4, the face detection component 410 may estimate the directions $\theta_1$ and $\theta_2$ of the audio sources 510 and 520, respectively, relative to a microphone array 502. More specifically, the direction of the first audio source $\theta_1$ is measured as the angle of deflection of a line extending from the microphone array 502 to the center of the bounding box 510 relative to a line orthogonal to the microphone array 502. Similarly, the direction of the second audio source $\theta_2$ is measured as the angle of deflection of a line extending from the microphone array 502 to the center of the bounding box 520 relative to a line orthogonal to the microphone array 502.

In some implementations, the face detection component 410 also may estimate the distances $d_1$ and $d_2$ of the audio sources 510 and 520, respectively, relative to the microphone array 502. More specifically, the distance of the first audio source $d_1$ is measured based on a size or dimension of the bounding box 510. For example, the size of the bounding box 510 may be compared to the size of a bounding box associated with a known distance to the microphone array 502 to determine the distance $d_1$. Similarly, the distance of the second audio source $d_2$ is measured based on a size or dimension of the bounding box 520. For example, the size of the bounding box 520 also may be compared to the size of a bounding box associated with a known distance to the microphone array 502 to determine the distance $d_2$. Aspects of the present disclosure recognize that larger bounding boxes are generally associated with objects closer to the microphone array 502. Thus, in the example of FIG. 5, the first audio source 510 may be closer to the microphone array 502 than the second audio source 520 ($d_1 < d_2$).

Figure 6:
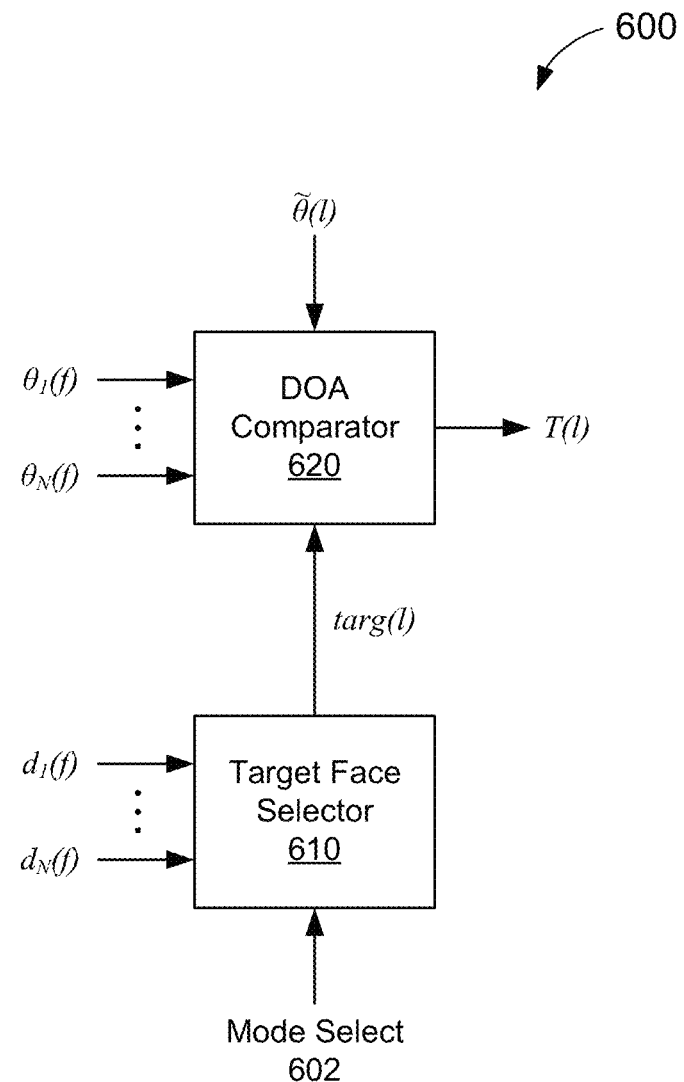
FIG. 6 shows a block diagram of an example system for target activity estimation, according to some implementations.

FIG. 6 shows a block diagram of an example system 600 for target activity estimation, according to some implementations. In some implementations, the system 600 may be one example of the target activity estimation component 430 of FIG. 4. More specifically, the system 600 may be configured to produce a respective target activity value T(l) for each frame l of an audio signal (such as the audio signal X(l,k) of FIG. 4) based on a DOA $\tilde{\theta}(l)$ of the audio frame and respective distances $d_1(f)$-$d_N(f)$ and directions $\theta_1(f)$-$\theta_N(f)$ of each of a number (N) of faces detected in an image associated with the audio frame (such as the image I(f) of FIG. 4).

The system 600 includes a target face selector 610 and a DOA comparator 620. The target face selector 610 is configured to select one or more of the N faces as a target face. More specifically, the target face selector 610 may determine a set of target faces (targ(l)), where targ(l) includes the index i associated with each of the selected faces. In some aspects, the target face selector 610 may select the target faces targ(l) based, at least in part, on an operating mode of the system 600. In some implementations, the system 600 may be configured to operate in a single-user mode. In some other implementations, the system 600 may be configured to operate in a conference mode. Still further, in some implementations, the system 600 may be configured to operate in the single-user mode or the conference mode based on a mode select signal 602.

When the system 600 is configured to operate in the single-user mode, the target face selector 610 may select only one of the N faces as the target face. In some implementations, the set of target faces targ(l) may include only the face closest to a microphone array used to receive the audio signal ($\min[d_1(f), \ldots, d_N(f)]$). With reference for example to FIG. 5, the target face selector 610 may select the first audio source 510 as the target face when operating in the single-user mode. As such, the set of target faces targ(l) may include only the index i associated with the first audio source 510 (targ(l)=1).

When the system 600 is configured to operate in the conference mode, the target face selector 610 may select multiple faces as the target faces. In some implementations, the set of target faces targ(l) may include each of the N faces detected in the image. With reference for example to FIG. 5, the target face selector 610 may select the audio sources 510 and 520 as target faces when operating in the conference mode. As such, the set of target faces targ(l) may include the indices i associated with each of the audio sources 510 and 520 (targ(l)=[1,2]).

The DOA comparator 620 is configured to determine the target activity value T(l) based on the DOA $\tilde{\theta}(l)$ of the audio frame and the directions ($\theta_t(f)$) of the faces indicated by the set of target faces targ(l) (also referred to herein as "target directions"), where t=targ(l). More specifically, the DOA comparator 620 may determine whether the DOA $\tilde{\theta}(l)$ of the audio frame is aligned with any of the target directions $\theta_t(f)$. In some implementations, the target activity value T(l) may indicate that the current frame l of the audio signal originates from a target audio source (T(l)=1) if any of the target directions $\theta_t(f)$ is within a threshold range ($\Delta$) of the DOA $\tilde{\theta}(l)$ of the audio frame:

$$T(l) = \begin{cases} 1 & \text{if } \theta_t(f) - \Delta \leq \tilde{\theta}(l) \leq \theta_t(f) + \Delta \text{ for any } t = targ(l) \\ 0 & \text{otherwise} \end{cases}$$

With reference for example to FIG. 5, when operating in the single-user mode (where only the first audio source 510 represents a target face), the DOA comparator 620 may determine that a given frame l of an audio signal originates from a target audio source (T(l)=1) if the DOA $\tilde{\theta}(l)$ of the audio frame is aligned with the direction $\theta_1$ of the first audio source 510 ($|\theta_1-\tilde{\theta}(l)|\leq\Delta$). By contrast, the DOA comparator 620 may determine that a given frame l of an audio signal does not originate from a target audio source (T(l)=0) if the DOA $\tilde{\theta}(l)$ of the audio frame is not aligned with the direction $\theta_1$ of the first audio source 510 ($|\theta_1-\tilde{\theta}(l)|>\Delta$).

When operating in the conference mode, the DOA comparator 620 may determine that a given frame l of an audio signal originates from a target audio source (T(l)=1) if the DOA $\tilde{\theta}(l)$ of the audio frame is aligned with the direction $\theta_1$ of the first audio source 510 or the direction $\theta_2$ of the second audio source 520 ($|\theta_1-\tilde{\theta}(l)|\leq\Delta$ or $|\theta_2-\tilde{\theta}(l)|\leq\Delta$). By contrast, the DOA comparator 620 may determine that a given frame l of an audio signal does not originate from a target audio source (T(l)=0) if the DOA $\tilde{\theta}(l)$ of the audio frame is not aligned with any of the directions $\theta_1$ or $\theta_2$ of the audio source 510 and 520, respectively ($|\theta_1-\tilde{\theta}(l)|>\Delta$ and $|\theta_2-\tilde{\theta}(l)|>\Delta$).

Figure 7:
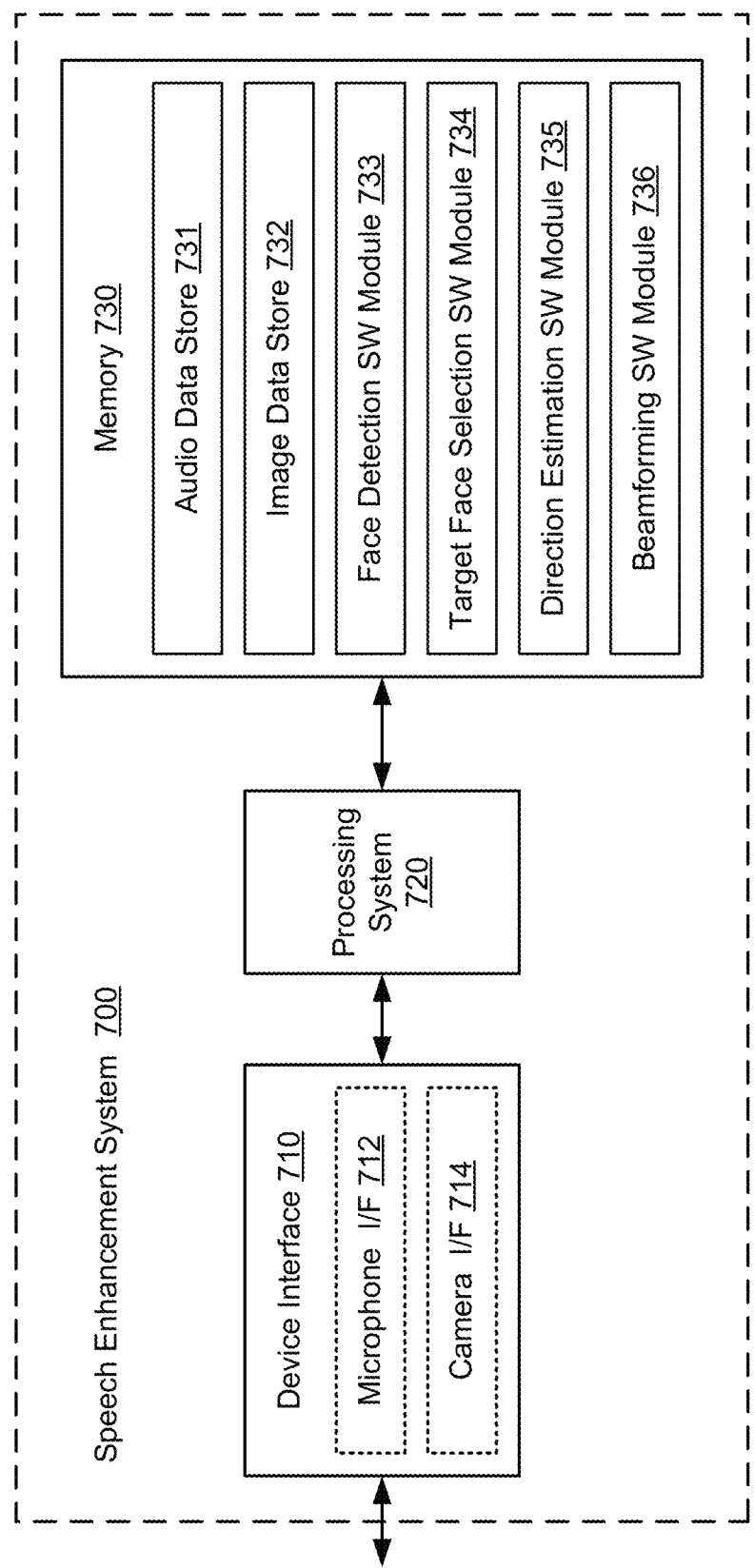
FIG. 7 shows another block diagram of an example speech enhancement system, according to some implementations.

FIG. 7 shows another block diagram of an example speech enhancement system 700, according to some implementations. More specifically, the speech enhancement system 700 may be configured to receive a multi-channel audio signal and produce an enhanced audio signal by filtering or suppressing noise in the received audio signal based, at least in part, on images associated with the audio signal. In some implementations, the speech enhancement system 700 may be one example of the audio receiver 200 of FIG. 2 or the speech enhancement system 300 of FIG. 3.

The speech enhancement system 700 includes a device interface 710, a processing system 720, and a memory 730. The device interface 710 is configured to communicate with various components of the audio receiver. In some implementations, the device interface 710 may include a microphone interface (I/F) 712 configured to receive an audio signal via a plurality of microphones. For example, the microphone I/F 712 may sample or receive individual frames of the audio signal at a frame hop associated with the speech enhancement system 700. In some implementations, the device interface 710 also may include a camera I/F 714 configured to receive a respective image associated with each frame of the audio signal. In some aspects, the framerate associated with the camera I/F 714 may be different than the frame hop associated with the microphone I/F 712.

The memory 730 may include an audio data store 731 and an image data store 732. The audio data store 731 is configured to store one or more frames of the audio signal and the image data store 732 is configured to store one or more images associated with the one or more frames of the audio signal, respectively. The memory 730 also may include a non-transitory computer-readable medium (including one or more nonvolatile memory elements, such as EPROM, EEPROM, Flash memory, or a hard drive, among other examples) that may store at least the following software (SW) modules:

- a face detection SW module 733 to detect one or more faces an image associated with a respective frame of the received audio signal;
- a target face selection SW module 734 to select a number (N) of target faces among the one or more faces detected in the received image;
- a direction estimation SW module 735 to determine a respective direction of each of the N target faces relative to the plurality of microphones; and
- a beamforming SW module 736 to selectively steer a beam associated with a multi-channel beamformer toward a direction-of-arrival (DOA) of the audio signal based at least in part on the directions of the N target faces.

Each software module includes instructions that, when executed by the processing system 720, causes the speech enhancement system 700 to perform the corresponding functions.

The processing system 720 may include any suitable one or more processors capable of executing scripts or instructions of one or more software programs stored in the speech enhancement system 700 (such as in the memory 730). For example, the processing system 720 may execute the face detection SW module 733 to detect one or more faces in an image associated with a respective frame of the received audio signal. The processing system 720 also may execute the target face selection SW module 734 to select a number (N) of target faces among the one or more faces detected in the received image. Further, the processing system 720 may execute the direction estimation SW module 735 to determine a respective direction of each of the N target faces relative to the plurality of microphones. Still further, the processing system 720 may execute the beamforming SW module 736 to selectively steer a beam associated with a multi-channel beamformer toward a DOA of the audio signal based at least in part on the directions of the N target faces.

Figure 8:
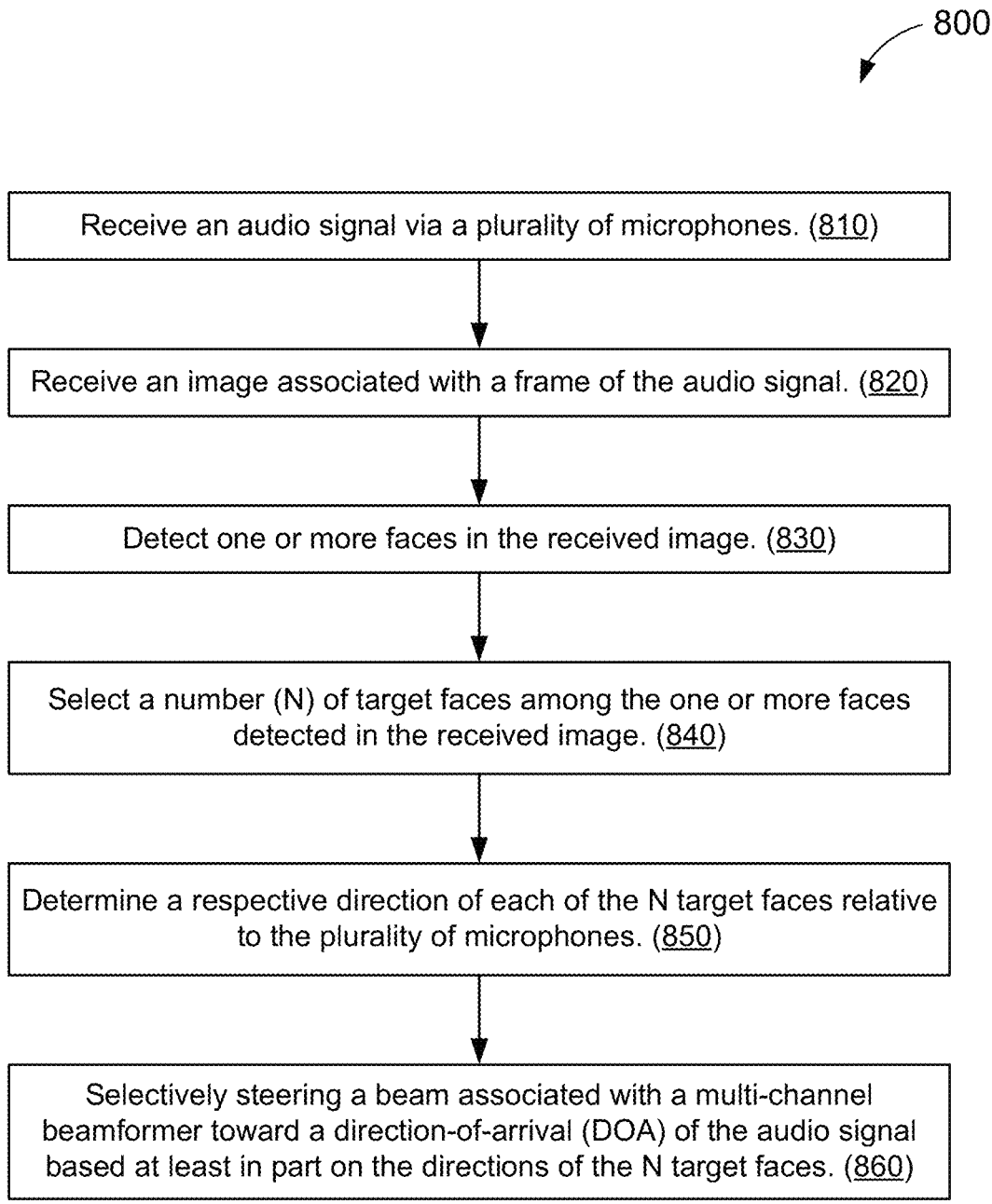
FIG. 8 shows an illustrative flowchart depicting an example operation for processing audio signals, according to some implementations.

FIG. 8 shows an illustrative flowchart depicting an example operation 800 for processing audio signals, according to some implementations. In some implementations, the example operation 800 may be performed by a speech enhancement system (such as the audio receiver 200 of FIG. 2 or any of the speech enhancement systems 300 or 700 of FIGS. 3 and 7, respectively).

The speech enhancement system receives an audio signal via a plurality of microphones (810). The speech enhancement system also receives an image associated with a frame of the audio signal (820). The speech enhancement system detects one or more faces in the received image (830). The speech enhancement system further selects a number (N) of target faces among the one or more faces detected in the received image (840). The speech enhancement system determines a respective direction of each of the N target faces relative to the plurality of microphones (850). Further, the speech enhancement system selectively steers a beam associated with a multi-channel beamformer toward a direction-of-arrival (DOA) of the audio signal based at least in part on the directions of the N target faces (860).

In some implementations, the speech enhancement system may select only one of the detected faces as the target face (N=1). In such implementations, the selecting of the N target faces may include determining which of the one or more faces is closest to the plurality of microphones, where the face that is closest to the plurality of microphones is selected as the target face. In some other implementations, the speech enhancement system may select more than one of the detected faces as a target face (N>1). In such implementations, each of the one or more faces may be selected as a respective one of the N target faces.

In some aspects, the speech enhancement system may further determine, for each of the N target faces, whether the direction of the target face is within a threshold range of the DOA of the audio signal. In some implementations, the selective steering of the beam may include steering the beam toward the DOA of the audio signal if the direction of at least one of the N target faces is within the threshold range of the DOA of the audio signal. In some other implementations, the selective steering of the beam may include refraining from steering the beam toward the DOA of the audio signal if none of the directions of the N target faces is within the threshold range of the DOA of the audio signal.

In some aspects, the multi-channel beamformer may be an MVDR beamformer that reduces a power of a noise component of the audio signal without distorting a speech component of the audio signal. In some implementations, the speech enhancement system may further calculate a filter associated with the MVDR beamformer based on a covariance of the noise component of the audio signal and a covariance of the speech component of the audio signal. In some implementations, the speech enhancement system may determine the covariance of the speech component of the audio signal based on determining that the direction of at least one of the N target faces is within the threshold range of the DOA of the audio signal. In some other implementations, the speech enhancement system may determine the covariance of the noise component of the audio signal based on determining that none of the directions of the N target faces is within the threshold range of the DOA of the audio signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of processing audio signals, comprising:
receiving an audio signal via a plurality of microphones;
receiving an image associated with a frame of the audio signal;
detecting one or more faces in the received image;
selecting a number (N) of target faces among the one or more faces detected in the received image;
determining a respective direction of each of the N target faces relative to the plurality of microphones; and
selectively steering a beam associated with a multi-channel beamformer toward a direction-of-arrival (DOA) of the audio signal based at least in part on the directions of the N target faces.

2. The method of claim 1, wherein N=1.

3. The method of claim 2, wherein the selecting of the N target faces comprises:
determining which of the one or more faces is closest to the plurality of microphones, the face that is closest to the plurality of microphones being selected as the target face.

4. The method of claim 1, wherein N>1.

5. The method of claim 4, wherein each of the one or more faces is selected as a respective one of the N target faces.

6. The method of claim 1, further comprising:
determining, for each of the N target faces, whether the direction of the target face is within a threshold range of the DOA of the audio signal.

7. The method of claim 6, wherein the selective steering of the beam comprises:
steering the beam toward the DOA of the audio signal if the direction of at least one of the N target faces is within the threshold range of the DOA of the audio signal.

8. The method of claim 6, wherein the selective steering of the beam comprises:
refraining from steering the beam toward the DOA of the audio signal if none of the directions of the N target faces is within the threshold range of the DOA of the audio signal.

9. The method of claim 6, wherein the multi-channel beamformer comprises a minimum variance distortionless response (MVDR) beamformer that reduces a power of a noise component of the audio signal without distorting a speech component of the audio signal.

10. The method of claim 9, further comprising:
calculating a filter associated with the MVDR beamformer based on a covariance of the noise component of the audio signal and a covariance of the speech component of the audio signal.

11. The method of claim 10, further comprising:
determining the covariance of the speech component of the audio signal based on determining that the direction of at least one of the N target faces is within the threshold range of the DOA of the audio signal.

12. The method of claim 10, further comprising:
determining the covariance of the noise component of the audio signal based on determining that none of the directions of the N target faces is within the threshold range of the DOA of the audio signal.

13. A speech enhancement system comprising:
a processing system; and
a memory storing instructions that, when executed by the processing system, causes the speech enhancement system to:
receive an audio signal via a plurality of microphones;
receive an image associated with a frame of the audio signal;
detect one or more faces in the received image;
select a number (N) of target faces among the one or more faces detected in the received image;
determine a respective direction of each of the N target faces relative to the plurality of microphones; and
selectively steer a beam associated with a multi-channel beamformer toward a direction-of-arrival (DOA) of the audio signal based at least in part on the directions of the N target faces.

14. The speech enhancement system of claim 13, wherein N=1 and the selecting of the N target faces comprises:
determining which of the one or more faces is closest to the plurality of microphones, the face that is closest to the plurality of microphones being selected as the target face.

15. The speech enhancement system of claim 13, wherein N>1 and each of the one or more faces is selected as a respective one of the N target faces.

16. The speech enhancement system of claim 13, wherein execution of the instructions further causes the speech enhancement system to:
determine, for each of the N target faces, whether the direction of the target face is within a threshold range of the DOA of the audio signal.

17. The speech enhancement system of claim 16, wherein the selective steering of the beam comprises:
steering the beam toward the DOA of the audio signal if the direction of at least one of the N target faces is within the threshold range of the DOA of the audio signal; and
refraining from steering the beam toward the DOA of the audio signal if none of the directions of the N target faces is within the threshold range of the DOA of the audio signal.

18. The speech enhancement system of claim 16, wherein the multi-channel beamformer comprises a minimum variance distortionless response (MVDR) beamformer that reduces a power of a noise component of the audio signal without distorting a speech component of the audio signal.

19. The speech enhancement system of claim 18, wherein execution of the instructions further causes the speech enhancement system to:
calculate a filter associated with the MVDR beamformer based on a covariance of the noise component of the audio signal and a covariance of the speech component of the audio signal.

20. The speech enhancement system of claim 19, wherein execution of the instructions further causes the speech enhancement system to:
determine the covariance of the speech component of the audio signal based on determining that the direction of at least one of the N target faces is within the threshold range of the DOA of the audio signal; and
determine the covariance of the noise component of the audio signal based on determining that none of the directions of the N target faces is within the threshold range of the DOA of the audio signal.

* * * * *